(12) United States Patent
Kawakami et al.

(10) Patent No.: US 6,378,670 B1
(45) Date of Patent: Apr. 30, 2002

(54) SLIDING MEMBER

(75) Inventors: Naohisa Kawakami; Tsukimitsu Higuchi; Takashi Inaba; Koichi Yamamoto; Toshio Egami; Takayuki Shibayama, all of Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 09/457,326

(22) Filed: Dec. 9, 1999

(30) Foreign Application Priority Data

Dec. 11, 1998 (JP) ............................................ 10-353256

(51) Int. Cl.[7] .............................................. F16D 69/00
(52) U.S. Cl. ............... 188/256; 188/251 R; 188/251 A; 52/167.1; 52/167.3
(58) Field of Search ............................. 188/251 R, 253, 188/255, 256, 251 A, 251 M, 261; 192/107 M; 52/167.1, 167.3

(56) References Cited

U.S. PATENT DOCUMENTS

| | | | | |
|---|---|---|---|---|
| 3,684,062 A | * | 8/1972 | Johnson | 188/251 R |
| 4,173,681 A | * | 11/1979 | Durrieu et al. | 428/409 |
| 5,250,255 A | * | 10/1993 | Sagawa et al. | 419/39 |
| 5,308,516 A | * | 5/1994 | Chiddick | 252/30 |
| 5,597,053 A | * | 1/1997 | Weng | 188/256 |
| 5,612,110 A | * | 3/1997 | Watremez | 428/66.2 |
| 5,771,642 A | * | 6/1998 | Lester | 52/167.1 |
| 5,788,027 A | * | 8/1998 | Shute et al. | 188/250 B |
| 5,845,438 A | * | 12/1998 | Haskell | 52/167.1 |
| 5,957,251 A | * | 9/1999 | Jones et al. | 188/251 R |
| 5,964,322 A | * | 10/1999 | Thompson et al. | 188/251 M |
| 6,109,399 A | * | 8/2000 | Crawford et al. | 188/250 B |
| 6,139,757 A | * | 10/2000 | Chiddick | 508/126 |
| 6,162,315 A | * | 12/2000 | Lamport | 156/204 |
| 6,167,992 B1 | * | 1/2001 | Torpey et al. | 188/73.1 |

FOREIGN PATENT DOCUMENTS

| | | | |
|---|---|---|---|
| EP | 0 076 573 | | 4/1983 |
| JP | 1082204 | * | 3/1998 |
| JP | 331483 | * | 12/1998 |
| JP | 45560 A | * | 2/2000 |
| JP | 74138 A | * | 3/2000 |
| JP | 170829 A | * | 6/2000 |

* cited by examiner

Primary Examiner—Pam Rodriguez
Assistant Examiner—Xuan Lan Nguyen
(74) Attorney, Agent, or Firm—Browdy and Neimark

(57) ABSTRACT

There is disclosed a sliding member which slidably contacts an counterpart member with friction and in which a friction force is varied without changing a contact pressure. A sliding member 11 is formed by covering a steel plate with sliding materials 13a to 13e different in friction coefficient. In this case, when a sliding direction of the counterpart member 14 is set to directions of arrows A and B, a sliding material 13a of a low friction coefficient is disposed in the middle, and the sliding materials 13b to 13e are arranged so that the friction coefficient gradually increases toward both terminal sides in the directions of arrows A and B of the sliding material 13a. According to the sliding member 11, the friction force increases as the counterpart member 14 moves in the directions of arrows A and B from the middle.

18 Claims, 10 Drawing Sheets

SLIDING MEMBER

BACKGROUND OF THE INVENTION (i) Field of the Invention

The present invention relates to a sliding member which relatively slides against a counterpart member, particularly to a sliding member in which the friction coefficient of a sliding face varies along a relative sliding direction to the counterpart memeber.

(ii) Description of the Related Art

In a tall building, there is provided a damping device (hereinafter referred to as "damper") to prevent the building from being intensively vibrated by earthquake or the like. One type of damper utilizes the friction resistance of a sliding plate. This damper comprises sliding plates secured to braces which are fixed to a building structure and which cross each other in an X-shape, and a clamp mechanism by which these sliding plates are clamped in such a manner as they can slide to each other.

The clamp mechanism is constructed such that a motor is rotated clockwise or counter-clockwise in accordance with a building vibration degree to thereby change a clamping force (contact pressure) applied to the sliding plates, whereby the magnitude of a friction force occurring between the sliding plates is changed.

Here, the reason why the contact pressure of the sliding plates is changed in accordance with the building vibration degree is that, for example, when the building is slightly vibrated by wind, and the like, and if the contact pressure of the sliding plates is increased, the friction force of the sliding plates becomes excessively large, so that the slight vibration cannot be absorbed, and the vibration of the building is even enlarged. Conversely, when the building is intensively vibrated by earthquake or the like, and when the contact pressure of the sliding plates is small, the friction force is small, so that sufficient vibration damping effect cannot be obtained.

However, in the conventional damper constituted to change the contact pressure of the sliding plates and the friction force by use of the clamp mechanism using the motor as a drive source, when power stoppage accident occurs during earthquake, the control to raise the sliding plate contact pressure as described above cannot be performed. Another problem is that a backup power supply has to be installed for the power stoppage.

SUMMARY OF THE INVENTION

To solve the above-described problems, an object of the present invention is to provide a sliding member which can vary the friction force without varying the contact pressure.

In the sliding member of the present invention, since the friction coefficient of the sliding face varies along a sliding direction relative to a counterpart member, a friction force varies without changing a contact pressure with the counterpart member.

In this case, in order to allow the friction coefficient of the sliding face to vary along the sliding direction relative to the counterpart member, the kind of the sliding face material is selected to differ along the sliding direction of the counterpart member.

Moreover, by allowing the kind of the material forming the sliding face to differ in a plurality of parts, and by changing the area ratio of a plurality of parts formed of different kinds of materials along the sliding direction relative to the counterpart member, the friction coefficient of the sliding face may be constituted to vary along the sliding direction relative to the counterpart member.

The material of the sliding face may be selected from a metal, a synthetic resin, and a combination of the metal and the synthetic resin.

BRIEF DESCRIPTION OF THE DRAWINGS

FIGS. 4A and 4B show the first step of a manufacture process in a third embodiment of the present invention, wherein FIG. 4A is a plan view; and FIG. 4B is a side view.

FIGS. 8A and 8B show the first step of a manufacture process in a fifth embodiment of the present invention, wherein FIG. 8A is a plan view and FIG. 8B is a vertical side view.

DETAILED DESCRIPTION OF THE PREFERRED EMBODIMENTS

Figure 19:
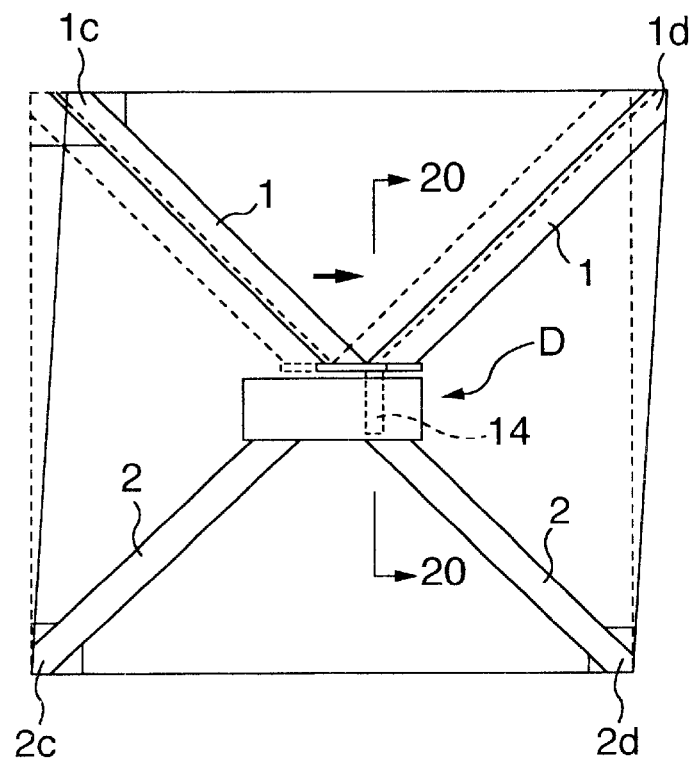
FIG. 19 is a sectional view showing a damping device relating to the present invention, which damping device is attached to bracing.
Figure 20:
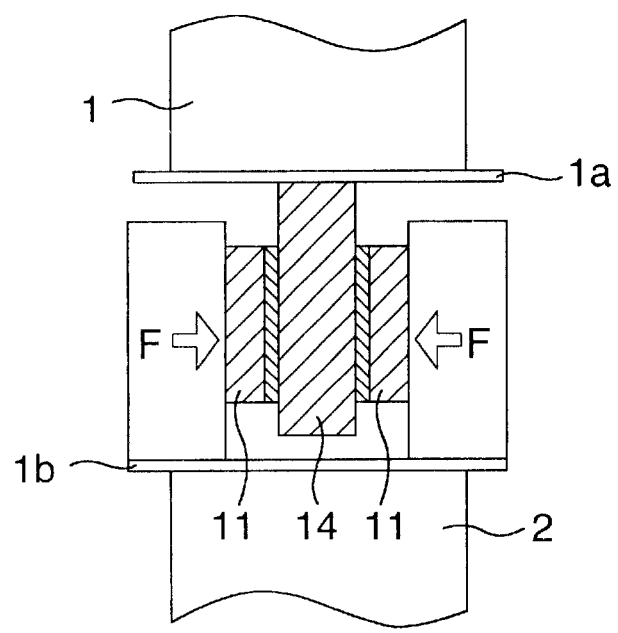
FIG. 20 is a partial sectional view taken along a line 20—20 in FIG. 19.

A first embodiment of the present invention will be described hereinafter with reference to the drawings. As shown in FIGS. 19 and 20, a sliding member according to the first embodiment is one used in a damping device (, i.e., damper).

In FIGS. 19 and 20, the damper (D) comprises a V-shaped member 1 acting as a part of bracing, an inverse V-shaped member 2 acting as another part of the bracing, a protruding member 14 fixed to the bottom of the V-shaped member 1 via a plate 1a and protruded downward, a pair of constant-clamping-force applying elastic means (F) disposed apart from each other and fixed to the top of the inverse V-shaped member 2 via a plate 1b, and sliding members 11 fixed to the elastic means (F) and placed in sliding pressure contact with the protruding member 14 which acts as a counterpart member of the sliding members.

During operation of the damper (D), the outer ends 1c, 1d, 2c, 2d of the members 1 and 2 are fixed to the structure of a building (i.e., columns and/or beams, and the like). The constant-clamping-force applying elastic means (F) comprise spring means, and forces the sliding members 11 and 11 to a counterpart member (, that is, the protruding member 14) in arrow directions with constant pressures to thereby hold the sliding members and the counterpart member 14 so that they are in pressure sliding contact with each other.

Figure 1:
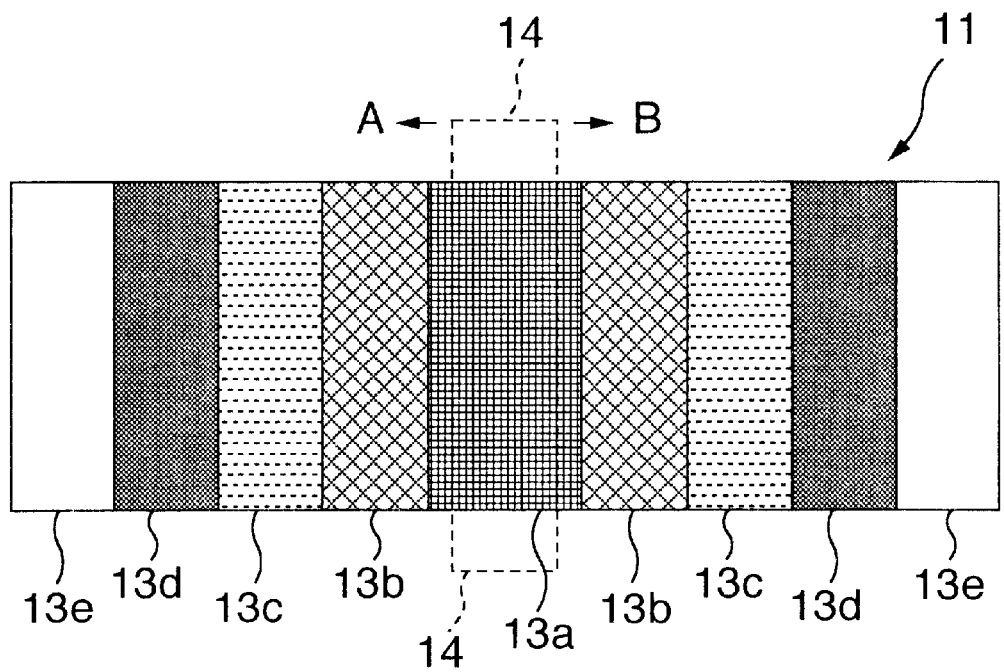
FIG. 1 is a plan view of a sliding member showing a first embodiment of the present invention.
Figure 2:
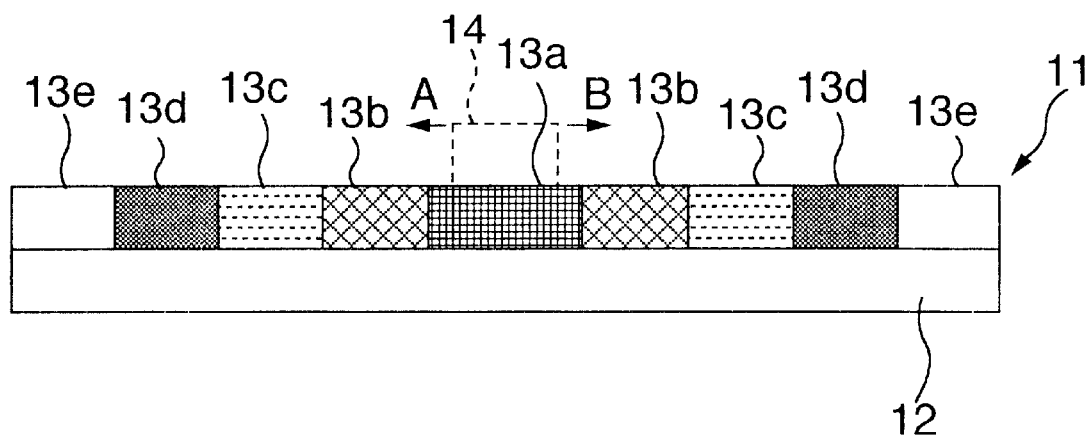
FIG. 2 is a side view of the sliding member.

The sliding member 11 will be described with reference to FIGS. 1 and 2. A sliding member 11 had a substrate of a steel plate (JIS-SUS 304 stainless steel) 12 with dimensions of 500 mm (length), 300 mm (width) and 9 mm (thickness) (hereinafter referred to as "500×300×9 mm"), and a plurality of sliding materials 13a to 13e different in friction coefficient. The surfaces of the sliding materials 13a to 13e act as a sliding face which slide on the counterpart member 14 formed of JIS-SUS 304 stainless steel and having a size of 400×50×24 mm, and the direction in which the sliding materials 13a to 13e are arranged coincides with the sliding direction relative to the counterpart member 14 (shown by arrows A and B).

In each of the sliding materials 13a to 13e, there were selectively mixed in a metal matrix both a low friction material and a high friction material having a friction coefficient twice or more times as high as the friction coefficient of the low friction material by appropriate amounts in accordance with the friction coefficient to be obtained. Here, the metal matrix of the sliding materials 13a to 13e was a mixture of: a Cu alloy containing 1 to 15 wt % of Sn and 0.005 to 1 wt % of P; and 40 wt % or less of reinforcing material such as Ni and Fe. As the low friction material having a friction coefficient of 0.1 to 0.4, solid lubricants were used, such as graphite (Gr), boron nitride (BN), molybdenum disulfide ($MOS_2$), and polytetrafluoroethylene resin (PTFE), and as the high friction material having a friction coefficient of 0.2 to 0.9, ceramics such as $Al_2O_3$, $SiO_2$ and SiC are used.

In the embodiment, the sliding material 13a located at a center portion was made of Cu (remainder)-10Sn-0.2P-8Gr (numerals indicate wt %, and the same shall apply hereinafter) and included a highest amount of low friction materials, the friction coefficient of which sliding material 13a is the lowest value of about 0.15. Further, each of side sliding materials 13e located at both ends is made of Cu (remainder)-10Sn-0.2P-1$Al_2O_3$ and contains a highest amount of high friction materials, the friction coefficient of which sliding materials 13e is the highest value of about 0.9. Furthermore, regarding the sliding materials 13b, 13c and 13d arranged between the sliding material 13a of the lowest friction coefficient and both of the side sliding materials 13e of the highest friction coefficient, the contents of graphite thereof as a solid lubricant material were set to be 5 wt %, 3 wt % and, 1.5 wt %, respectively, and the contents of alumina ($Al_2O_3$) of the sliding materials 13b, 13c and 13d were set to be 0 wt %, 0 wt %, and, 0.5 wt %, respectively.

Therefore, the sliding face formed by the sliding materials 13b to 13d is constituted so that the friction coefficient successively became high toward both terminal ends from the center portion thereof. The width of the sliding material 13a in the sliding direction was 100 mm, and the width of each of the sliding materials 13b to 13e in the sliding direction was 50 mm.

The use of the sliding member 11 constituted as described above in a damper for a high-rise building is shown in FIGS. 19 and 20. In the drawings, a counterpart member 14 is fixed by welding to a V-shaped brace member 1 having the ends thereof fixed to upper beams, and sliding members 11 are fixed to another inverse V-shaped brace member 2 through elastic means (F) with springs so that the counterpart member 14 may be in sliding pressure contact with the sliding face of the sliding members 11. In this case, the contact pressure between the sliding members 11 and the counterpart member 14 is held to be constant by the elastic means (F). In a normal state in which the building does not vibrate, the counterpart member 14 is in pressure sliding contact with the sliding material 13a of the lowest friction coefficient.

In the case where the building slightly vibrates by the influence of wind and the like, the counterpart member 14 slides at a small amplitude from the center position of the sliding material 13a of the lowest friction coefficient of the sliding member 11 in directions of arrows A, B. Therefore, the friction force acting between the sliding member 11 and the counterpart member 14 is relatively small, effectively absorbs the slight vibration of the building, and minimizes the vibrating of the entire building.

On the other hand, when the building intensively vibrates by earthquakes etc., the counterpart member 14 largely slides from the center portion of the sliding material 13a of the lowest friction coefficient of the sliding member 11 in the directions of arrows A, B. Therefore, the counterpart member 14 slides extensively to the sliding material on the terminal side of the high friction coefficient from the sliding material 13a of the low friction coefficient as shown in FIG. 19, and the vibration is reduced by a large friction resistance occurring during the sliding between the distal sliding materials 13e of the highest friction coefficient and the counterpart member 14, or between the sliding materials of the relatively high friction coefficient in the vicinity of the material 13e and the counterpart member 14. In this case, since the friction coefficient of the sliding member 11 is set so that it gradually increases in the directions of arrows A and B from the center portion thereof, the vibration is reduced by the gradually increasing friction resistance force occurring by the counterpart member 14 relatively moving in the directions of arrows A and B from the center portion of the sliding material 13a of the low friction coefficient.

Figure 3:
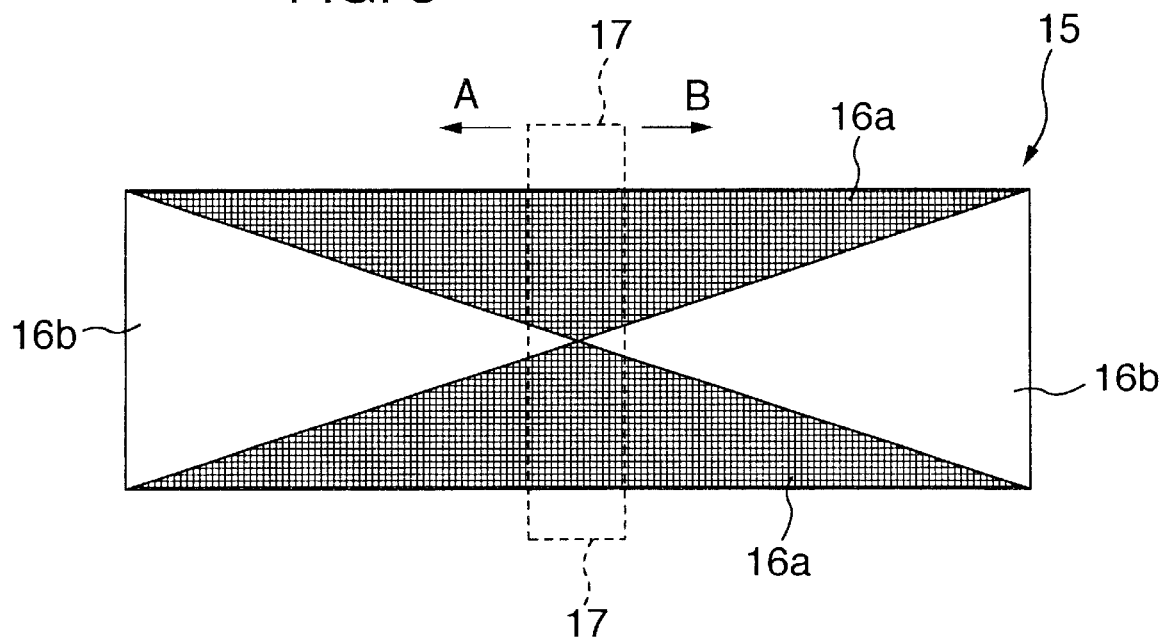
FIG. 3 is a plan view showing a second embodiment of the present invention.

FIG. 3 shows a second embodiment of the sliding member of the present invention, which sliding member was formed by a plurality of sliding materials so that the friction coefficient continuously varied.

Specifically, in a sliding member 15 of the second embodiment, the rectangular area of a steel plate (not shown) were parted into four sections along two diagonal lines, and two kinds of sliding materials 16a, 16b are coated onto the parted sections so that the adjacent sliding materials were different in kinds from each other. The sliding material 16a was made of Cu (remainder)-10Sn-0.2P-8Gr, and the sliding material 16b is made of Cu (remainder)-10Sn-0.2P-8Gr-1$Al_2O_3$.

In the same manner as the first embodiment, the sliding material 16a and 16b had a metal matrix of Cu alloy mixed with reinforcing materials such as Ni and Fe, and 1 to 20 wt % of at least one solid lubricant selected from the group consisting of low friction materials such as graphite (Gr), boron nitride (BN), molybdenum disulfide ($MoS_2$), and polytetrafluoroethylene resin (PTFE), so that a sliding material having a low friction coefficient of 0.1 to 0.4 was formed. The sliding material 16b was formed by mixing the above metal matrix with 0.1 to 10 wt % of at least one high friction material selected from the group consisting of $Al_2O_3$, $SiO_2$ and SiC so that a sliding material of a high friction coefficient of 0.2 to 0.9 was formed.

In the sliding member 15 constituted as described above, a counterpart member 17 formed of JIS-SUS 304 stainless steel and having dimensions of 400 mm×50×24 mm relatively slides in the directions of arrows A and B. In this case, with respect to the sliding direction, a contact part between the counterpart member 17 and the sliding member 15 is located in the sliding material 16a of the low friction coefficient when it is in the center portion of the sliding member 15, and is located in the area of the sliding material 16b of the high friction coefficient when it slides toward both distal portions, and the sliding material 16b of the high friction coefficient occupies most of the area of the distal portions of the sliding member.

In the constitution, the area ratio of the sliding materials 16a and 16b contacting the counterpart member 17 varies in dependence on the position of the counterpart member 17, and the friction coefficient of the sliding face varies in dependence on the change of the area ratio. Specifically, the friction coefficient of the sliding member 15 is minimized to be about 0.17 in the center portion thereof occupied most by the sliding material 16a of the low friction coefficient, gradually increases toward both distal portions thereof from the center portion, and becomes maximum of about 0.7 in both distal portions. Therefore, the counterpart member 17 receives a relatively small friction resistance in the center portion of the sliding member 15, receives a gradually increasing friction resistance toward both of the distal portions, and receives the largest friction resistance in the distal portions.

In the first and second embodiments, when the sliding materials 13a to 13e and 16a and 16b different in friction coefficient are formed in the manners of the first and second embodiments, various processes such as sintering, brazing, casting and coating may be used. In the following description of the embodiments, the manufacture processes by sintering, brazing, casting, and the like are described.

Figure 4A:
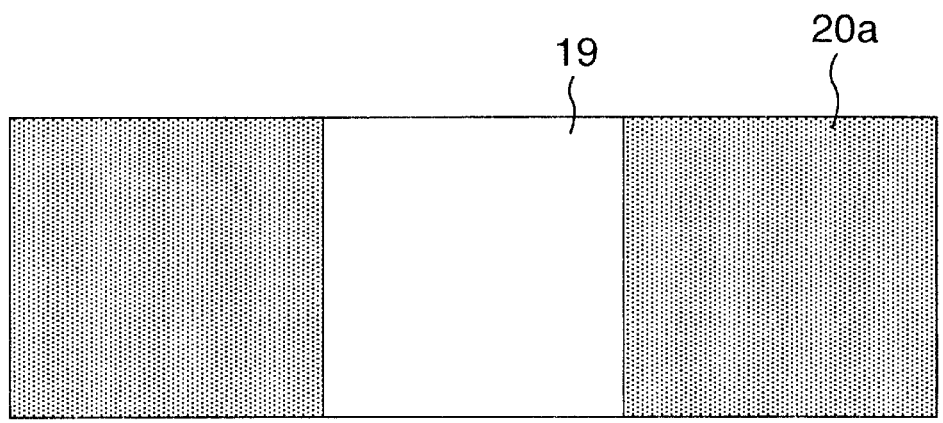
Figure 4B:
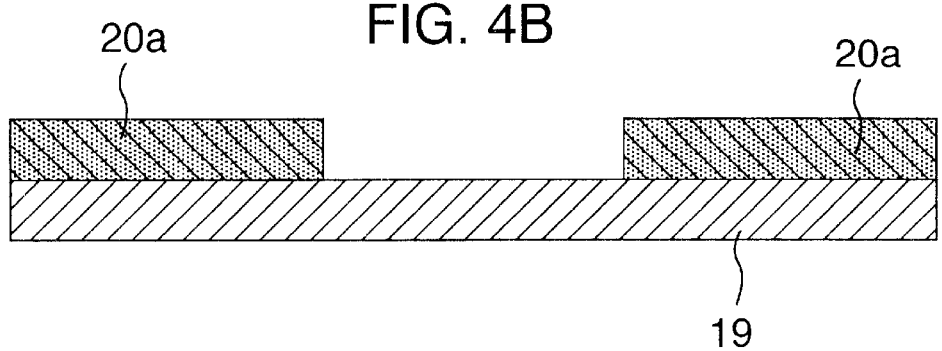
Figure 5A:
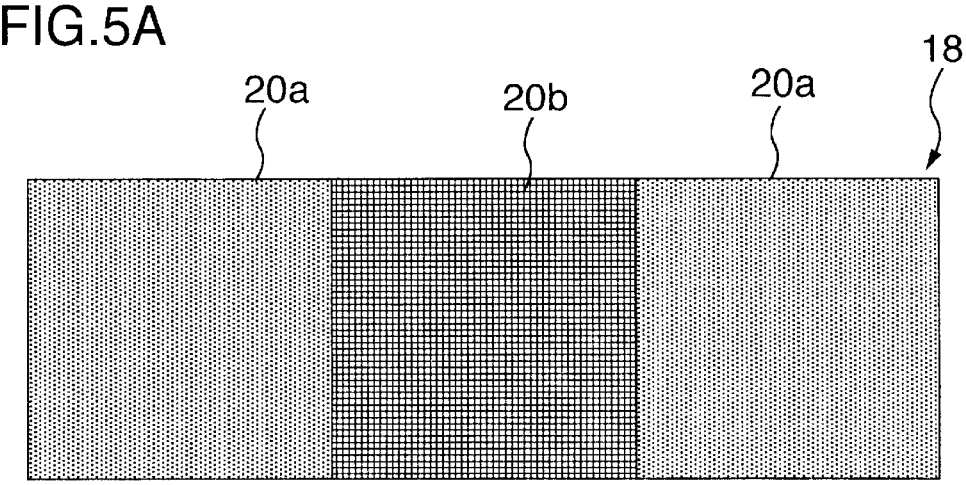
FIGS. 5A and 5B are drawings showing the second step of the manufacture process in connection with FIGS. 4A and 4B.
Figure 5B:
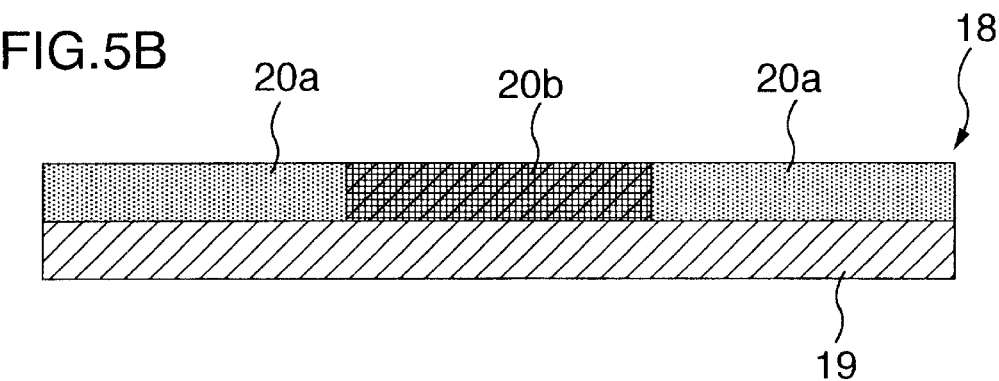

FIGS. 4 and 5 show a third embodiment. A sliding member 18 of the embodiment was produced by first, as shown in FIGS. 4A and 4B, bonding a sliding material 20a (friction coefficient of about 0.52) made of a Cu-Sn alloy (bronze) (, that is, Cu (remainder)-10Sn-0.2P-2Gr-5$Al_2O_3$) as the material of high friction coefficient to both terminal sides of longitudinal direction (sliding direction of the counterpart member) of a steel plate 19 through, for example, sintering. Subsequently, a sliding material 20b formed of a mixture of Cu-Sn alloy and Gr (, that is, Cu (remainder)-10Sn-0.2P-10Gr, which has friction coefficient of about 0.15) was similarly bonded to the steel plate as the material of low friction coefficient between the sliding materials 20a and 20a through sintering as shown in FIGS. 5A and 5B.

Figure 6A:
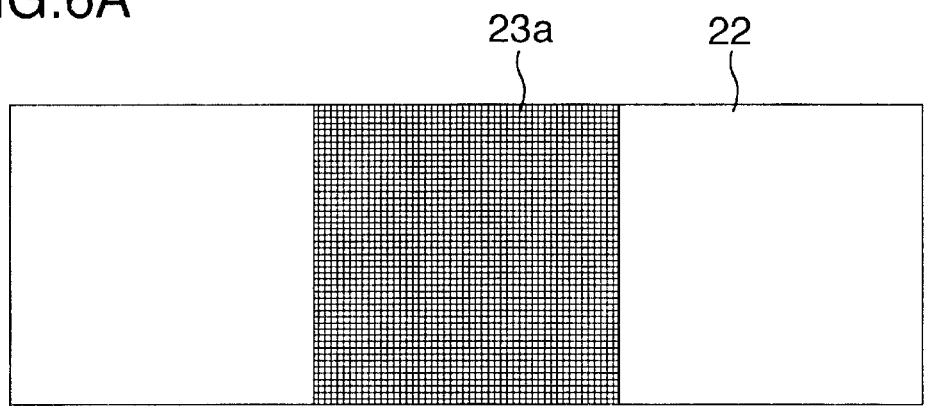
FIGS. 6A and 6B are drawings showing the first step of another manufacture process in a fourth embodiment of the present invention.
Figure 6B:
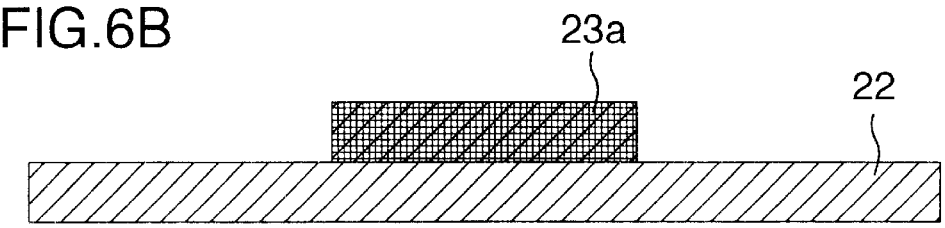
Figure 7A:
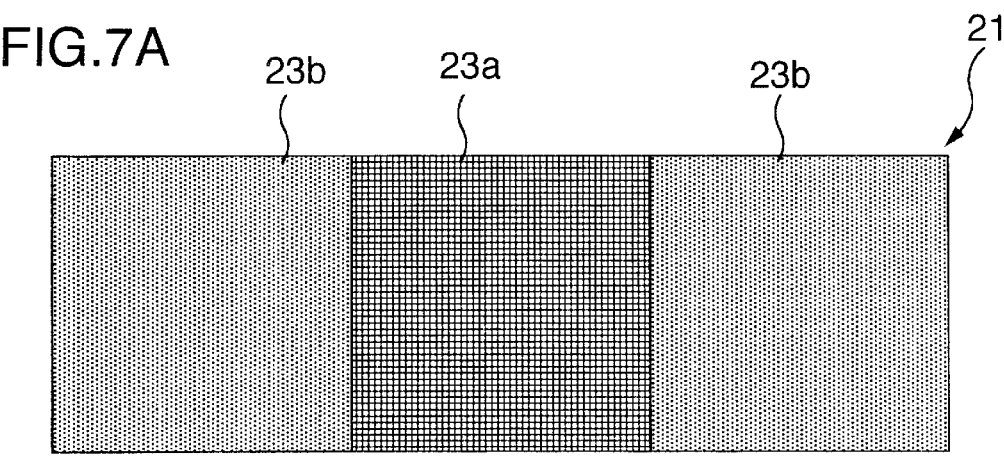
FIGS. 7A and 7B are drawings showing the second step of the manufacture process in connection with FIGS. 6A and 6B.
Figure 7B:
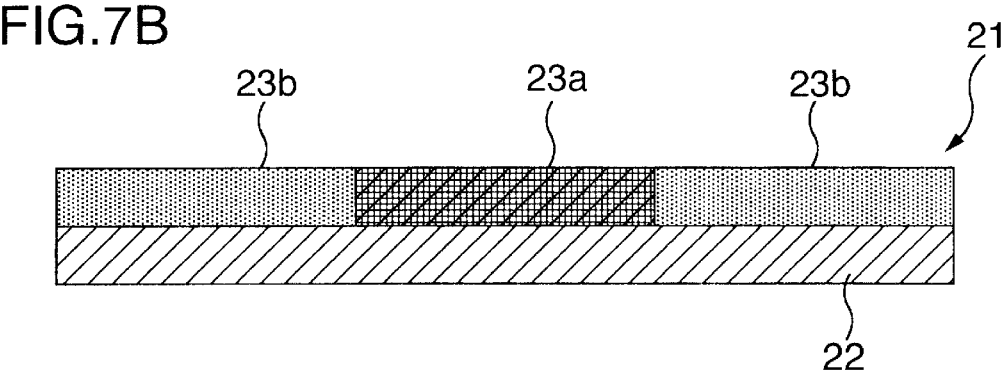

FIGS. 6 and 7 show a fourth embodiment of the present invention. A sliding member 21 of the embodiment was produced by first, as shown in FIGS. 6A and 6B, bonding a sliding material 23a of a mixture of Cu-Sn alloy and Gr, that is, Cu (remainder)-10Sn-0.2P-8Gr and having a friction coefficient of about 0.15 as the material of low friction coefficient to the center portion of a steel plate 22 through sintering. Subsequently, as shown in FIGS. 7A and 7B, a sliding material 23b of Sn alloy (white metal), that is, Sn (remainder)-4Cu-9Sb and having a friction coefficient of about 0.8 was bonded to the steel plate 22 as the material of high friction coefficient at both terminal sides of a sliding material 23a through casting.

In a fifth embodiment of the present invention shown in FIGS. 8 to 10, resin is used as the low friction material, and metal is used as the high friction material.

Figure 8A:
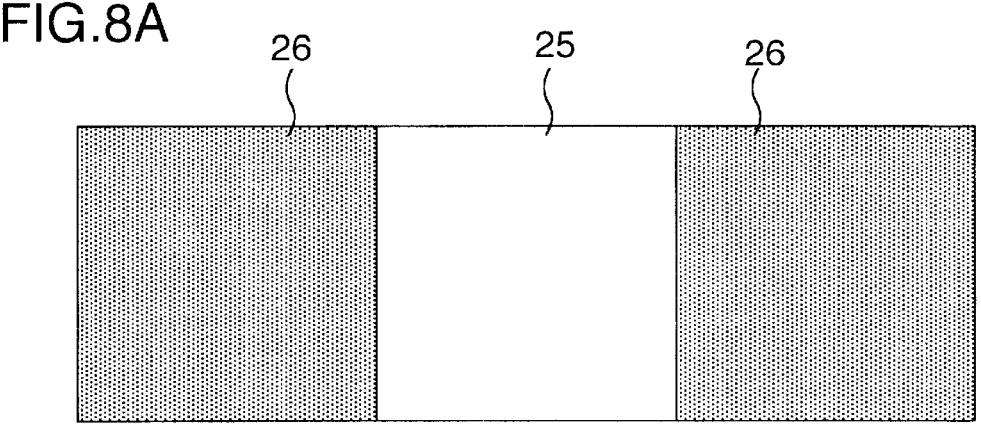
Figure 8B:
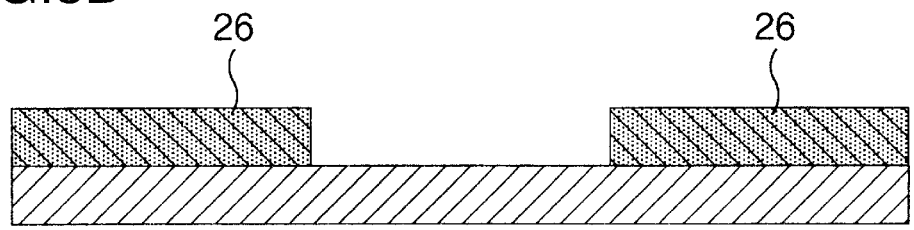
Figure 9A:
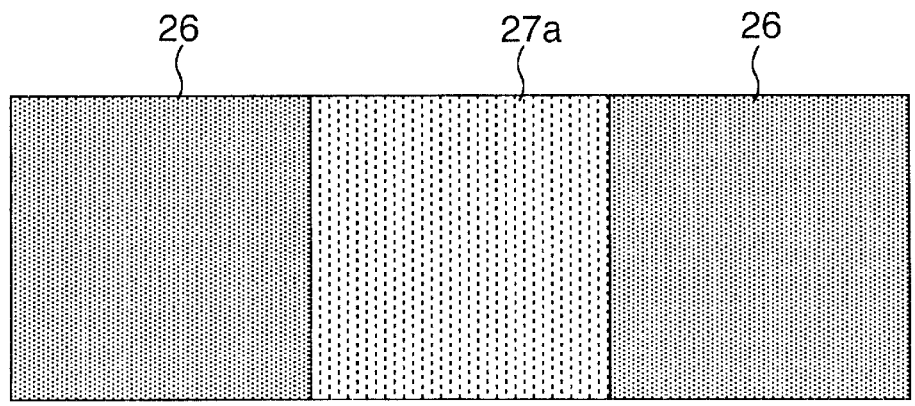
FIGS. 9A and 9B are drawings showing the second step of the manufacture process in connection with FIGS. 8A and 8B.
Figure 9B:
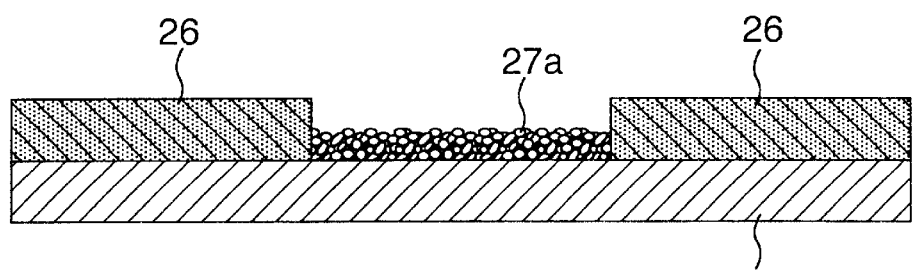
Figure 10A:
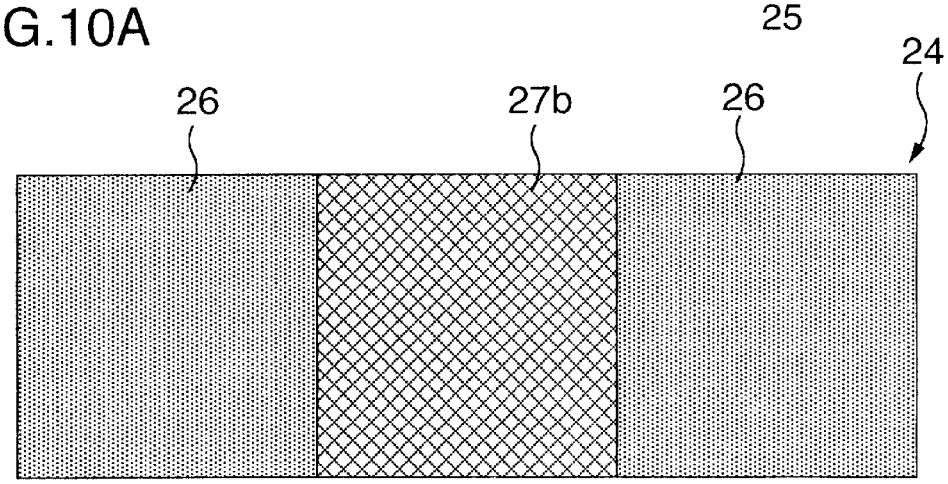
FIGS. 10A and 10B are drawings showing the third step of the manufacture process in connection with FIGS. 9A and 9B.
Figure 10B:
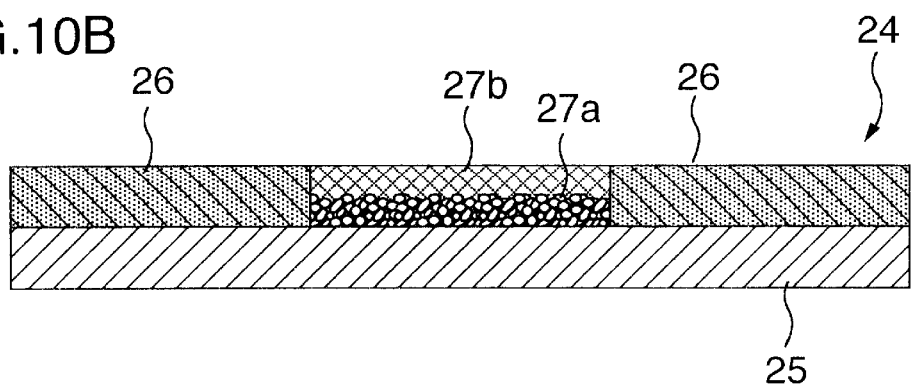

A sliding member 24 of this embodiment was produced by a process comprising the step of: first, as shown in FIGS. 8A and 8B, bonding a sliding material 26 of Cu-Sn alloy (bronze), that is, Cu (remainder)-6Sn-3Ni-2Gr and having a friction coefficient of about 0.32 as the material of high friction coefficient to both terminal sides of a steel plate 25 through sintering, bonding coarse metal particle layer 27a of Cu-Sn alloy to the steel plate between both of the terminal side sliding materials 26 and 26 through sintering as shown in FIGS. 9A and 9B, and impregnating the metal layer 27a with a sliding material 27b formed of the PTFE resin and having a low friction coefficient of about 0.1, that is, PTFE (remainder)-50Pb as shown in FIGS. 10A and 10B.

A sixth embodiment of the present invention shown in FIGS. 11 to 13 is based on the same concept as that of the second embodiment. A sliding member of this embodiment was formed by a process comprising the steps of forming recesses as each having a diameter of 8 mm and a depth of 4 mm in a sliding material having a friction coefficient of about 0.7, disposing another sliding material different in friction coefficient in the recesses, and setting the area ratio of two types of sliding materials different in friction coefficient to 40% in the middle and to 3% in the end to change the friction coefficient along the sliding direction of an counterpart member which is formed of JIS-SUS 304 stainless steel and has a dimension of 400 mm×50×24 mm (thickness).

Figure 11A:
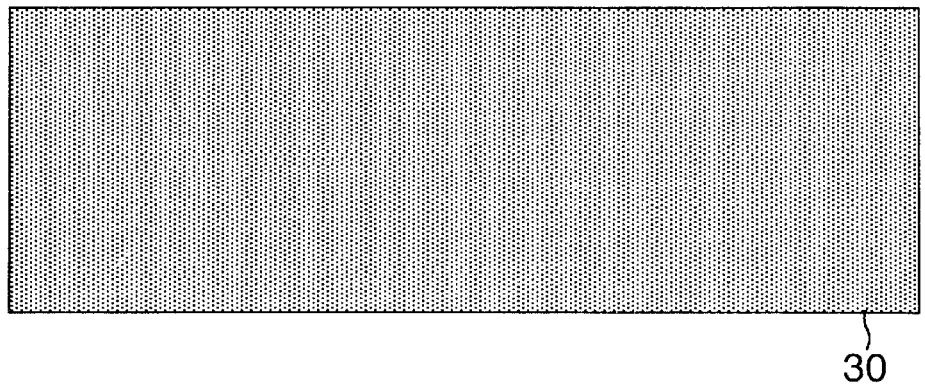
FIGS. 11A and 11B are drawings showing the first step of a process in a sixth embodiment of the present invention.
Figure 11B:
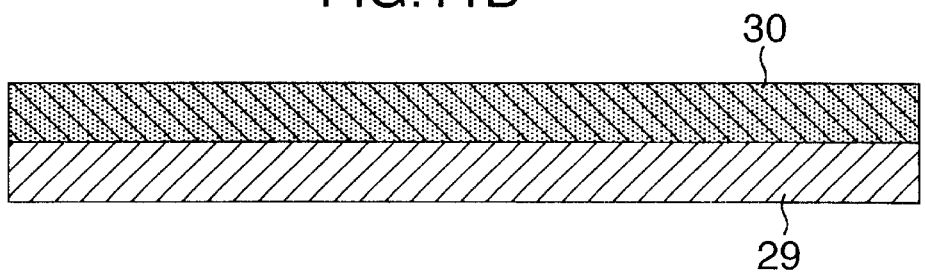
Figure 12A:
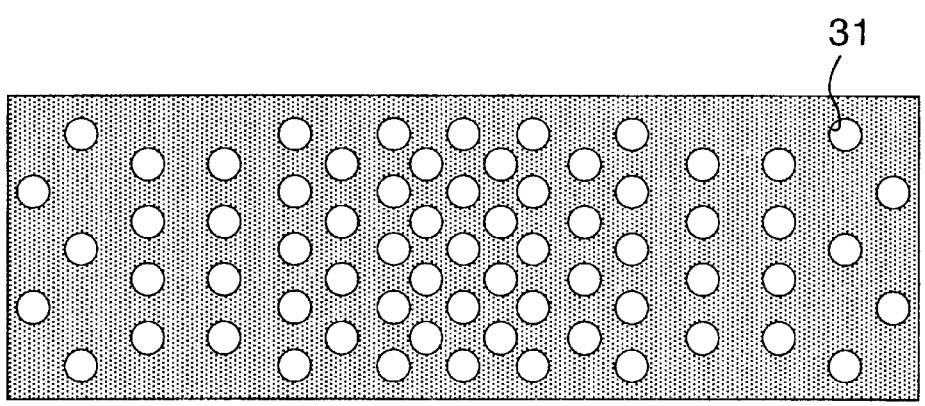
FIGS. 12A and 12B are drawings showing the second step of the process in connection with FIGS. 11A and 11B.
Figure 12B:
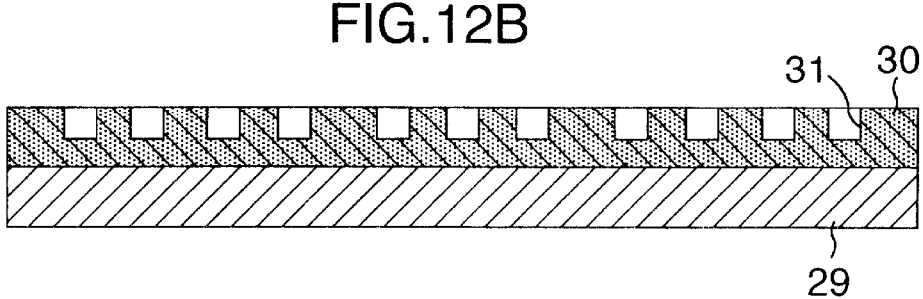

Specifically, in a sliding member 28 of the embodiment, first as shown in FIGS. 11A and 11B, a steel plate 29 was covered, for example, with a sliding material 30 formed of Cu-Sn alloy as the high friction coefficient material by sintering, and as shown in FIGS. 12A and 12B, recesses 31 were then formed in the sliding material 30 by mechanical processing such as drilling. In this case, the area ratio of the recesses 31 to the Cu-Sn alloy sliding material was set such that it became high in the center portion thereof, and gradually decreases toward both of the terminal ends in the longitudinal direction.

Figure 13A:
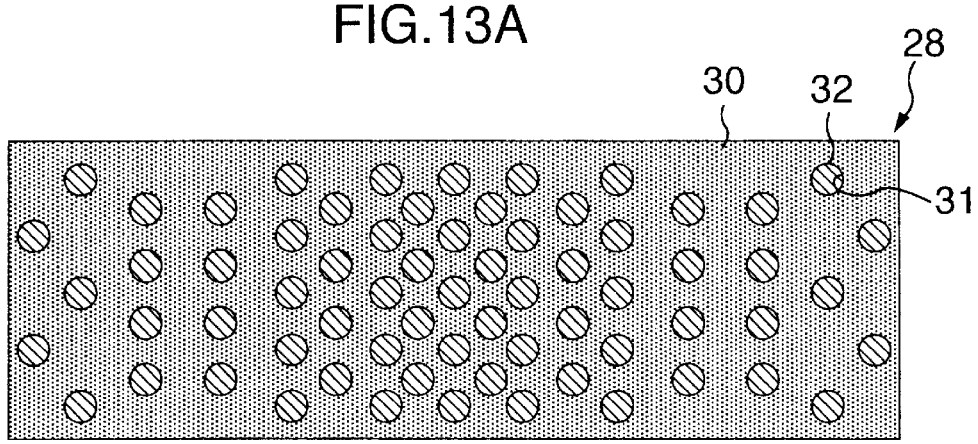
FIGS. 13A and 13B are drawings showing the third step of the process in connection with FIGS. 12A and 12B.
Figure 13B:
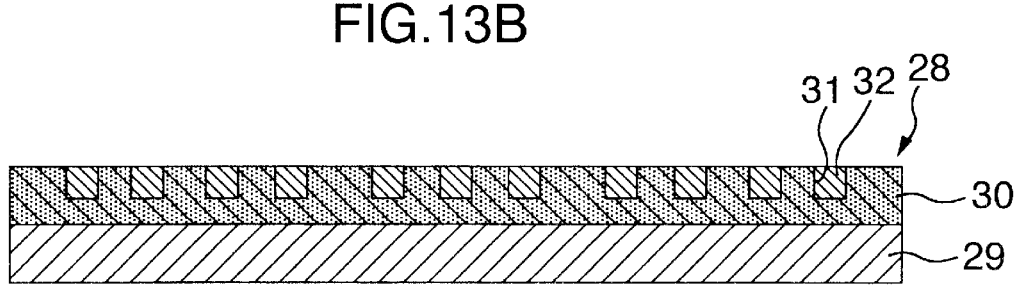

Subsequently, pins 32 formed by sliding materials with low friction materials such as Gr and PTFE resin mixed therein are embedded as shown in FIGS. 13A and 13B. In this structure, the friction coefficient of the sliding face of the sliding member 28 varied in the range of 0.1 to 0.65 along the sliding direction of the counterpart member.

In a seventh embodiment of the present invention shown in FIGS. 14 to 16, in the same manner as the sixth embodiment, recesses each having a size of 5 mm×3 mm and a depth of 2 mm were formed in a sliding material having a friction coefficient of about 0.7, and sliding materials different in the friction coefficient along the sliding direction of the counterpart member are deposited in the recesses. Specifically, a material 37a had a friction coefficient of about 0.1, a material 37b had a friction coefficient of 0.8, and a material 37c had a friction coefficient of 0.3.

Thereby, the friction coefficient was varied in the sliding direction of an counterpart member which was formed of JIS-SUS 304 stainless steel and had a size of 400 mm×50 mm×24 mm (thickness).

Figure 14A:
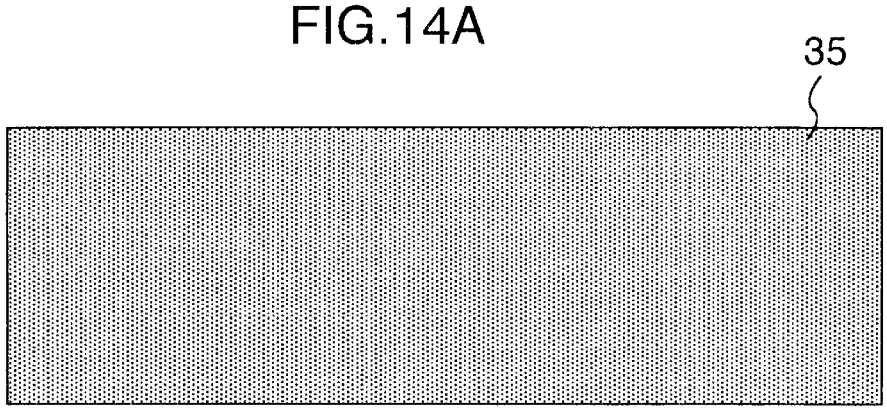
FIGS. 14A and 14B are drawings showing the first step of a process according to a seventh embodiment of the present invention.
Figure 14B:
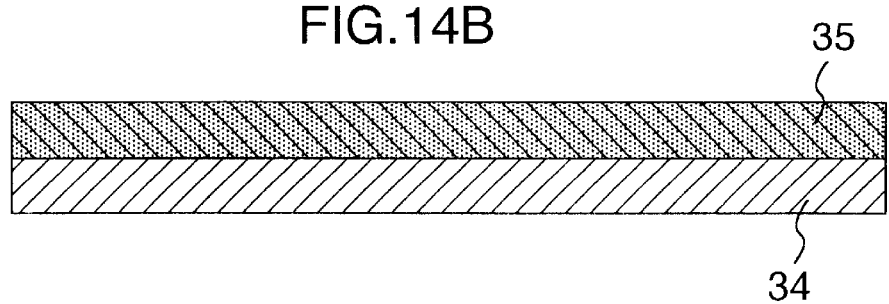
Figure 15A:
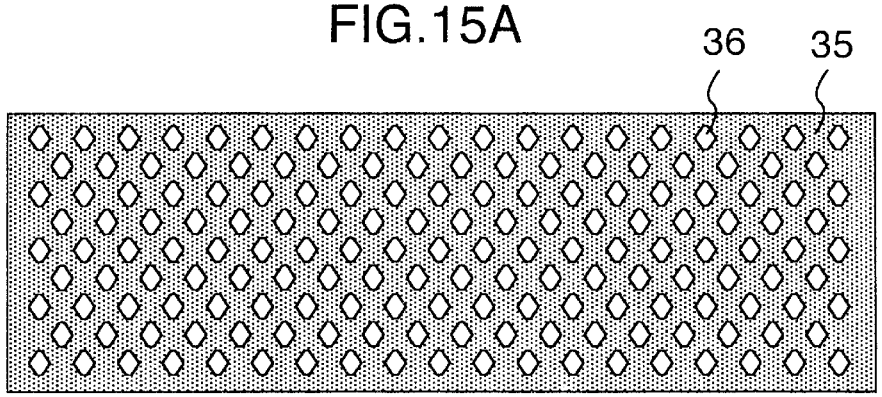
FIGS. 15A and 15B are drawings showing the second step of the process in connection with FIGS. 14A and 14B.
Figure 15B:
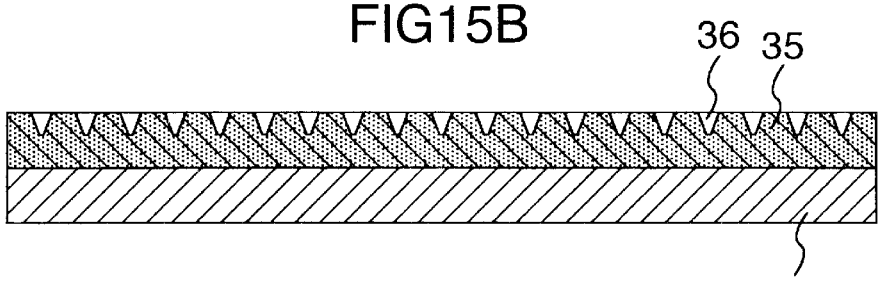

Specifically, a sliding member 33 of the embodiment was formed by a process having the step of: first, as shown in FIGS. 14A and 14B, covering a steel plate 34 with a sliding material 35 made of Cu-Sn alloy as a base material, that is, Cu (remainder)-0.5 to 15Sn-0 to 0.7P-0 to 40 (at least one of Ni, Fe, Zn, Al, Co, Mn and Si)-0 to 30Pb (or Bi) by sintering, and subsequently, as shown in FIGS. 15A and 15B, forming recesses 36 in a sliding material 35 by machine processing such as pressing. In this case, the forming density of the recesses 36 having a size of 5 mm×3 mm and a depth of 2 mm is substantially the same over the entire.

Figure 16A:
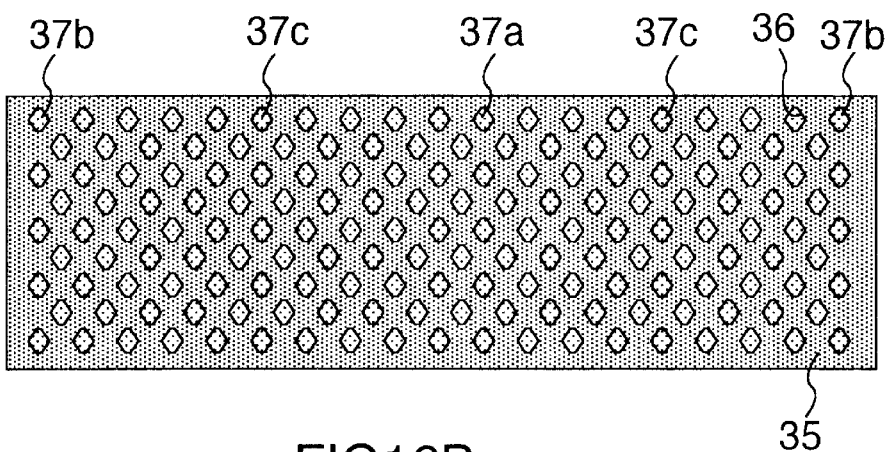
FIGS. 16A and 16B are drawings showing the third step of the process in connection with FIGS. 15A and 15B.
Figure 16B:
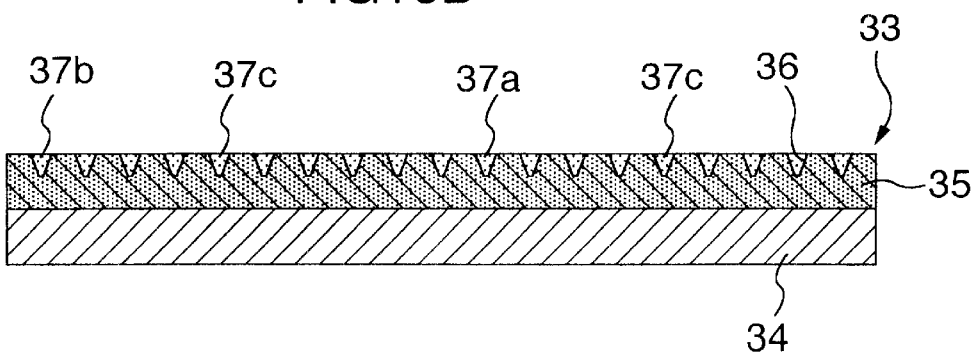

Subsequently, for example, low friction materials 37a such as Gr and PTFE were embedded in the recesses 36 in the center portion, high friction materials 37b such as $Al_2O_3$ being embedded in the recesses 36 on both terminal sides, and medium friction materials 37c formed by mixing the low and high friction materials to set a medium friction coefficient were embedded in the other recesses, as shown in FIGS. 16a and 16B. In this structure, the friction coefficient of the sliding member 33 varied in the sliding direction of a counterpart member.

Additionally, the present invention is not limited to the embodiments described above and shown in the drawings, and the expansion or modification explained below is possible.

Figure 17:
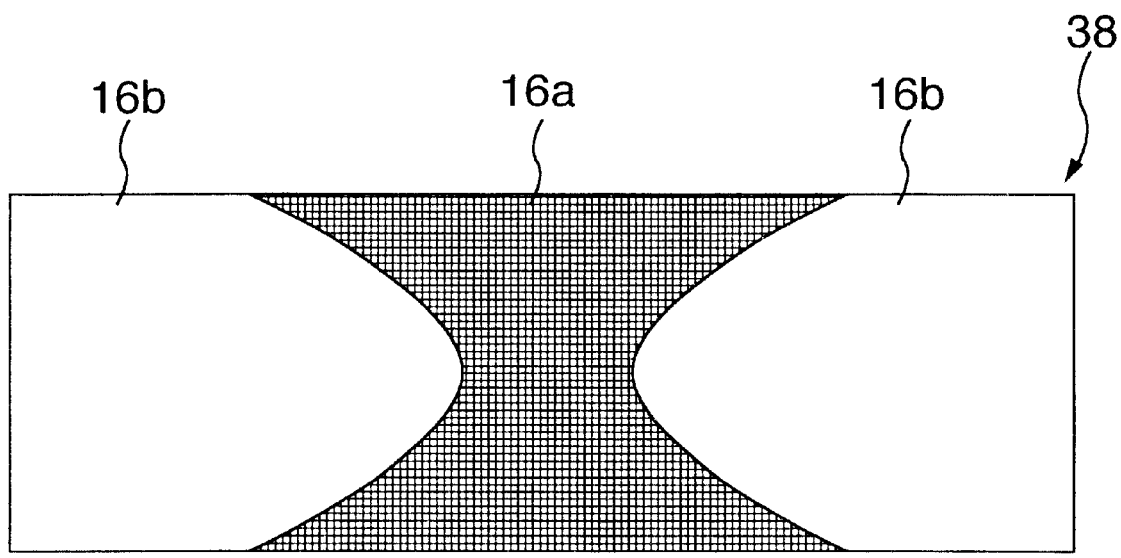
FIG. 17 is a plan view showing a sliding member according to an eighth embodiment of the present invention.
Figure 18:
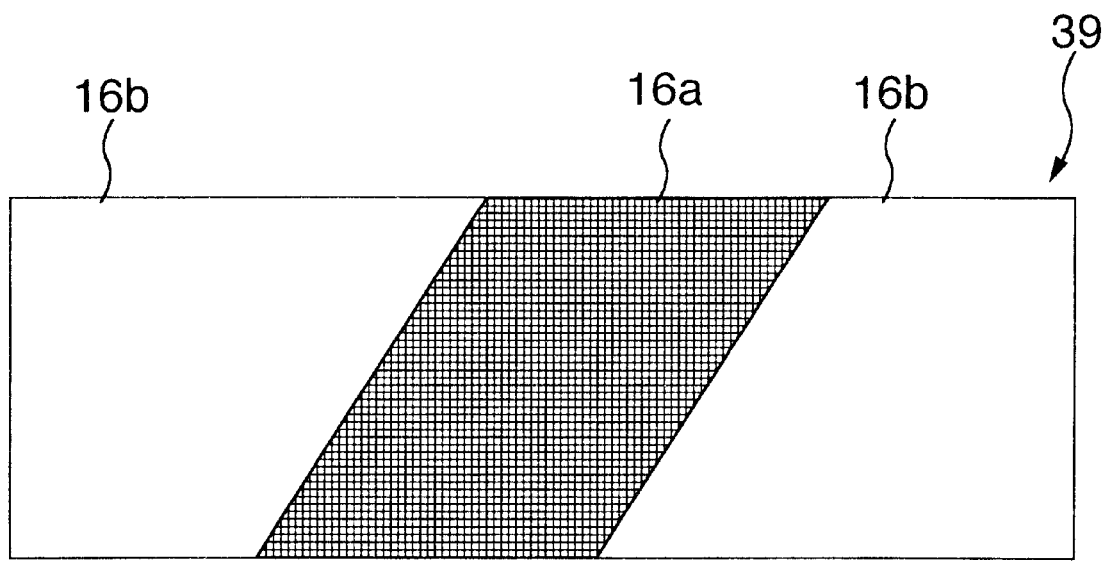
FIG. 18 is a plan view showing a sliding member according to a ninth embodiment of the present invention.

When two types of sliding materials 16a and 16b different in friction coefficient are disposed with different area ratios, a boundary of the sliding materials 16a and 16b may be constituted to form a parabola like in a sliding member 38 of an eighth embodiment shown in FIG. 17, or the boundary of the sliding materials 16a and 16b may be constituted to form an inclined parallel line like in a sliding member 39 of a ninth embodiment shown in FIG. 18.

The sliding face of the sliding member may be constituted only by resin. For example, a low friction coefficient part may be coated by PTFE, a high friction coefficient part may be coated by phenol resin, and a medium friction coefficient part may be obtained by varying the ratio of PTFE and phenol resin to perform the coating.

Recesses 31 and 36 may be circular, rhombic, or triangular, and may have any other shape.

The application of the sliding member is not limited to the friction plate of the damper of the building. For example, the sliding member may be used as a brake shoe when braking is automatically applied before a bumping post so that a vehicle moving along rails is prevented from going off the terminal end of the rails. In this case, the sliding member is fixed, for example, on the side on which the rails are laid, and the friction coefficient of the sliding face is set so that it gradually increases toward the bumping post. Additionally, the sliding member is constituted to slidably contact the braking part of the vehicle when the vehicle passes a certain position. Thereby, the vehicle can securely be stopped before the bumping post without rapidly exerting a large friction resistance force (braking force) to the vehicle at the time of braking start, or by applying a large braking force before the bumping post.

In the direction in which the friction coefficient of the sliding member varies, the coefficient may be varied along a circular arc insofar as the sliding direction of the counterpart member draws the circular arc.

What is claimed is:

1. A sliding member extended in a sliding direction and provided with
   (1) a central zone located centrally with respect to the sliding direction and
   (2) terminal zones each located terminally with respect to the sliding direction,
   wherein said sliding member is adapted to be in sliding contact with a counterpart member, said sliding member comprising
   a sliding face having a plurality of zones formed of materials different from each other so that different zones have different friction coefficients between said sliding face and the counterpart member,
   wherein said friction coefficients increase only in succession from said central zone to each of said terminal zones,
   whereby said sliding face varies in succession in a sliding direction relative to the sliding counterpart member.

2. A sliding member according to claim 1, wherein each of said materials of said sliding face is selected from the group consisting of a metal, a synthetic resin, and a combination of the metal and the synthetic resin.

3. A sliding member according to claim 1, wherein said sliding face is provided, at said central zone thereof, with a minimum friction coefficient, said sliding face being further provided, at each of said terminal zones, with a maximum friction coefficient.

4. A sliding member according to claim 1, wherein said friction coefficients vary a plurality of times from said central zone of said sliding face to each of said terminal zones of said sliding face.

5. A sliding member according to claim 1, wherein said friction coefficients vary continuously from said central zone of said sliding face to each of said terminal zones of said sliding face.

6. A sliding member according to claim 1, further comprising a substrate on which said sliding face is provided.

7. A sliding member according to claim 1, wherein a maximum friction coefficient of said terminal zones zone of said sliding face is not less than two times a minimum friction coefficient of said central zone of said sliding face.

8. A sliding member according to claim 1, wherein area ratios of said zones formed of materials different from each other are varied in the sliding direction relative to said counterpart member.

9. A sliding member according to claim 8, wherein each of said materials is selected from the group consisting of a metal, a synthetic resin, and a combination of the metal and synthetic resin.

10. A sliding structure comprising
    a sliding member extended in a sliding direction and provided with
    (1) a central zone located centrally with respect to the sliding direction and
    (2) terminal zones each located terminally with respect to the sliding direction
    wherein said sliding member comprises
    a sliding face having a plurality of zones formed of materials different from each other, and
    a counterpart member facing said sliding face while being in sliding contact therewith in said sliding direction,
    wherein friction coefficients between said sliding face and said counterpart member are varied in succession in said sliding direction so that said friction coefficients only increase from said central zone to each of said terminal zones.

11. In a damping device for preventing a building from being intensively vibrated by an earthquake, comprising a sliding member having a sliding face adapted to be in sliding contact with a counterpart surface, the improvement wherein said sliding face is made of a plurality of materials different from each other so that friction coefficients defined between said sliding face and said counterpart member vary from a minimum in a central zone of said sliding face to a maximum at zones spaced from said central zone, in succession in a sliding direction relative to said counterpart member.

12. The damping device according to claim 11, wherein area ratios of said materials are varied in the sliding direction relative to said counterpart member.

13. The damping device according to claim 11, wherein each of said materials of said sliding face is selected from the group consisting of a metal, a synthetic resin, and a combination of the metal and the synthetic resin.

14. The damping device of claim 12, wherein each of said materials of said sliding face is selected from the group consisting of a metal, a synthetic resin, and a combination of the metal and the synthetic resin.

15. The damping device according to claim 11, wherein said friction coefficients defined between the sliding face and said counterpart member vary a plurality of times from said central zone in said sliding direction to each of said sliding face zones spaced from said central zone in said sliding direction.

16. The damping device according to claim 11, wherein said friction coefficients defined between the sliding face and said counterpart member vary continuously from said central zone in said sliding direction to each of said sliding face zones spaced from said central zone in said sliding direction.

17. The damping device according to claim 11, further comprising a substrate on which said sliding face is provided.

18. The damping device according to claim 11, wherein a maximum friction coefficient defined between the sliding face and said counterpart member at said zones spaced from said central zone is not less than two times a minimum friction coefficient defined therebetween at said central zone.

* * * * *